(12) United States Patent
Buzzi (10) Patent No.: US 8,881,544 B2
(45) Date of Patent: *Nov. 11, 2014

(54) AUXILIARY POWER UNIT FOR ON BOARD CONDITIONING SYSTEMS OF POWER BOATS

(75) Inventor: Fabio Buzzi, Annone Brianza (IT)

(73) Assignee: FB Design S.R.L. (IT)

( * ) Notice: Subject to any disclaimer, the term of this patent is extended or adjusted under 35 U.S.C. 154(b) by 122 days.

This patent is subject to a terminal disclaimer.

(21) Appl. No.: 13/567,090

(22) Filed: Aug. 6, 2012

(65) Prior Publication Data

US 2013/0025313 A1  Jan. 31, 2013

Related U.S. Application Data

(63) Continuation-in-part of application No. 12/368,430, filed on Feb. 10, 2009, now Pat. No. 8,256,239.

(30) Foreign Application Priority Data

Feb. 22, 2008  (IT) .............................. MI2008A0292

(51) Int. Cl.
*F25B 27/00* (2006.01)
*B63J 2/04* (2006.01)

(52) U.S. Cl.
CPC . *B63J 2/04* (2013.01); *Y02T 70/529* (2013.01)
USPC ............................. 62/323.1; 62/323.3; 62/498

(58) Field of Classification Search
CPC ............. B63J 2/04; F25F 1/022; F25B 27/00; B60H 1/3226

USPC .................. 62/240, 323.1, 323.3, 323.4, 498
See application file for complete search history.

(56) References Cited

U.S. PATENT DOCUMENTS

| | | |
|---|---|---|
| 3,806,971 A | 4/1974 | Elling |
| 3,987,748 A | 10/1976 | Carroll |
| 4,177,648 A | 12/1979 | Ohling |
| 4,442,786 A | 4/1984 | Conners |
| 4,476,798 A | 10/1984 | Backus |
| 4,599,964 A | 7/1986 | Kenney et al. |
| 4,729,334 A * | 3/1988 | DeJean, Jr. ...................... 114/255 |
| 4,922,724 A | 5/1990 | Grayson et al. |
| 5,080,032 A | 1/1992 | Giles |
| 5,129,343 A | 7/1992 | Giles |
| 5,161,478 A * | 11/1992 | Strieb ........................... 114/361 |
| 5,231,946 A | 8/1993 | Giles |
| 5,832,856 A | 11/1998 | Giles |
| 5,848,536 A | 12/1998 | Dodge et al. |
| 5,989,084 A | 11/1999 | Tsunoda et al. |
| 6,026,653 A * | 2/2000 | Presnell .......................... 62/177 |

(Continued)

*Primary Examiner* — Mohammad M Ali
(74) *Attorney, Agent, or Firm* — Hess Patent Law Firm LLC; Robert J. Hess (57) ABSTRACT

A power unit for air conditioning systems installed on boats, including at least one compressor, of the mass produced type used in the automobile industry, connected to the circuit of the conditioning system, at least one mechanical pump for circulation of a heat exchange fluid along a circuit and one or more rotating electrical machines. Operation of the power unit is ensured during navigation by an internal combustion engine for marine propulsion, for example a four stroke engine of the type normally used for outboard marine propulsion, mass produced at low costs, while when the boat is in port it is ensured by an electric motor. The fan coils are also of the mass produced type used in the automobile industry.

21 Claims, 8 Drawing Sheets

(56) References Cited

U.S. PATENT DOCUMENTS

| | | |
|---|---|---|
| 6,044,901 A | 4/2000 | Basala |
| 6,047,942 A | 4/2000 | Kennedy |
| 6,414,399 B1 | 7/2002 | Bianchi |
| 6,701,733 B2 | 3/2004 | Brunner |
| 6,916,161 B2 | 7/2005 | Brunner |
| 2001/0001363 A1 | 5/2001 | Dodge et al. |
| 2001/0017335 A1 | 8/2001 | Kutlucinar |
| 2002/0017108 A1 | 2/2002 | Schooley |
| 2003/0013356 A1 | 1/2003 | Burns |
| 2003/0037757 A1 | 2/2003 | Osband |
| 2003/0164166 A1 | 9/2003 | Takeuchi |
| 2004/0007005 A1 | 1/2004 | Brunner |
| 2004/0060321 A1 | 4/2004 | Brunner |
| 2004/0134858 A1 | 7/2004 | Clukies |
| 2005/0064768 A1 | 3/2005 | Lowe |
| 2005/0204610 A1 | 9/2005 | Bogart et al. |
| 2005/0236013 A1 | 10/2005 | Huston et al. |
| 2006/0055173 A1 | 3/2006 | Gianfranco |
| 2006/0234566 A1 | 10/2006 | Ando |
| 2007/0145745 A1 | 6/2007 | Woods et al. |
| 2007/0163932 A1* | 7/2007 | Gianfranco .................. 210/137 |
| 2008/0029014 A1 | 2/2008 | Giles |

* cited by examiner

AUXILIARY POWER UNIT FOR ON BOARD CONDITIONING SYSTEMS OF POWER BOATS

CROSS-REFERENCE TO COPENDING PATENT APPLICATIONS

This is a continuation-in-part of Ser. No. 12/368,430 filed Feb. 10, 2009.

BACKGROUND OF THE INVENTION

1. Field of the Invention

The present invention relates to a power unit for air conditioning systems principally intended for installation on power boats, such as cabin cruisers or cruising yachts.

2. Discussion of Related Art

A cabin cruiser is a type of power boat that provides accommodation for its crew and passengers inside the structure of the craft. A cabin cruiser usually ranges in size from 25 to 45 feet (7.6 to 13.7 m) in length, with larger pleasure craft usually considered yachts. These craft are generally equipped with a head (toilet), a galley, and at least one berth. Most cabin cruisers usually have a small dining area and some have an aft cabin (a cabin to the rear of the cockpit, with a double bed). Some cabin cruisers are equipped with heating, air conditioning, and power generators. Most also have water heaters and shore power electric systems.

Cruising yachts are by the far the most common yacht in private use, making up most of the 35 to 80 feet (10.7 to 24 m) range. They mainly differ from cabin cruisers because they are more complex in design and equipped with both technological and logistical systems suitable for longer period of stay at sea. So, they may have a large number of cabins below deck, galley, toilet with shower, storage rooms, etc. besides complex navigational and radio-communication systems.

Another category of vessels includes the boat designed for professional use. In many cases, their design is typical and specific for their use and function (e.g.: fishboats, tugs, firefighting boats, etc.), but in many cases they are derived from cruisers or yachts, with just some adaptation. This last category includes most of patrol boats for Coast Guard, Police, Customs & Excise duties. On the other hand can be said that marine designers and shipyards, to reduce costs, design boats that can easily and economically adapted to very different purposes in both leisure and professional fields.

The boats of the categories described above can adopt a very variable range of power plants, both in type and power installed. It is possible find small cruisers with gasoline outboard motors (tens of kW of installed power) and yachts with diesel engines and shaftlines (thousands of kW of installed power). It can be said that gasoline outboard motor propulsion, also in twin or triple configuration, with engines each up to 300-350 hp can be found in the top range of leisure boats. The very same boats are often made available by the shipyards also in inboard gasoline or diesel engines configuration. Gasoline fuel engines are more common in some areas of the world (such as the USA and the Arabic Gulf) where gasoline fuel cost is lower and for power up to about 500 hp each, while diesel is largely spread all over the world, for any power range and type of use. Diesel engines characteristics make them suitable to be coupled with any type of available marine propulsion system, ranging from immersed propellers, to stern drives, water jets, pods and surface drives. Gasoline inboard engines are normally coupled to stern drives or surface drives.

The large number of boats, of any type, also of medium-small size, fitted with one or more cabins or, generally, one or more closed spaces, makes the air conditioning system considered desirable and essential by almost all boat owners, at least in warm and hot areas of the world, even as an aftermarket installed accessory.

Depending on the type of boat, systems having different concepts can be used. However, even for the smallest boats (i.e. with only one room to be warmed/cooled) the energy source remains the electrical current, which is generated by a generator set or by the shore power line if the boat is in port. This activates an electric motor, which drives the compressor of the conditioning system.

In the case of boats of larger dimensions, with more than one room (or cabin) to be warmed/cooled, centralized systems are installed. These can be of two types: with direct distribution of a thermal exchange fluid to the evaporators or with circulation of treated water, i.e. previously warmed/cooled by a conditioning device through a heat exchanger, sent to one or more fan coils.

In any case, all air conditioning systems available on the market require the presence of a generator set capable of supplying the necessary power for an electrically operated compressor.

In fact, in air conditioning systems installed on boats, the compressor is a device operated by an electric motor, which, owing to the fact that it can also be powered directly by the shore power network, requires an alternating current power supply. The choice of using alternating current power supply, instead of continuous current taken from batteries of on board electrical system (that is typically 12V or 24V) is easily explicated. The higher the voltage can be supplied to the electrical machine, the higher the power that can be obtained with the same current intensity or, on the other side, lower current is required to obtain the same power output. It is important to remind, also, that the higher the current, the larger the section of wiring required to reduce electrical resistance and dissipation. This means also higher weight and cost of the electrical wiring.

The rated installed power of the compressor (conventionally indicated with the unit of measure BTU/h) depends on the size of the system, i.e. on its characteristic parameters, namely the volume to be warmed/cooled, the difference in temperature to be imparted, the thermal exchange fluid used (i.e. its specific heat) and the temperature of the water in the operational area (that acts as coolant for the open circuit in case of cooling). The higher the installed power of the compressor, the higher the electrical power required and the larger the dimensions, cost and weight of the power generator set.

For the reasons stated above, the electrical power required by the compressor motor, as already mentioned, is normally supplied by the electric generator of a generator set installed for this purpose, which must also supply the accessories of the system, such as the water circulation pumps and the fan coil fans. Alternatively, when the boat is moored in an appropriately equipped port, the power supply to the compressor motor and to the aforesaid accessories can be provided by the shore power network.

Nonetheless, due to the high cost and considerable weight added, the procedure depicted above can be rarely performed. A generator set capable of supplying utilities with alternating current is rarely present on small and medium sized pleasure boats, where the on board batteries charged by the alternators of the main motors are generally sufficient to supply current to the on-board services, systems and electrical appliances and this absence makes it not practicable the installation of an air-conditioning system.

SUMMARY OF THE INVENTION

From the above, it is possible to identify the limits for installation of air conditioning systems in small and medium sized cabin cruiser boats and cruiser yachts: increase in cost, weight and overall dimensions of the generator set, such as to also considerably influence the performance of cabin cruiser boats and cruiser yachts.

In general, one object of the present invention concerns a proposal for a power unit for air conditioning systems installed on cabin cruiser boats and cruiser yachts that overcomes the identified limits, preferably at a particularly low cost.

Another object of the present invention is to propose a power unit of the type mentioned above which allows combination therein of all the functions required to ensure operation of an air conditioning system both during navigation and while the cabin cruiser boat on which it is installed is in port.

A further object of the present invention is to propose a power unit of the type mentioned above capable of providing other functions, for example functions useful in the event of an emergency.

Yet another object of the present invention is to propose a power unit of the type mentioned above which can be installed without distinction on boats propelled by gasoline engines or by diesel engines.

Yet another object of the present invention is to propose a power unit of the type mentioned above which is particularly suitable for installation on boats propelled by gasoline outboard motor(s).

These objects are achieved by means of the present invention, which relates to a power unit for conditioning systems installed on cabin cruiser boats. The power boat may be equipped with an on board air conditioning system (such as for providing both cooling air conditioning and heating air conditioning) that includes an on board conditioning unit to provide heating and cooling for cabin spaces, an auxiliary power unit for powering the on board conditioning unit, and a main power unit for marine propulsion of the power boat. The auxiliary power unit includes at least one drive motor and means for driving the following components in rotation: at least one compressor connected to a circuit of the on board conditioning unit; at least one mechanical pump for circulating a heat exchange fluid along an open circuit; and one or more rotating electrical machines, wherein said at least one drive motor is an internal combustion engine with a four stroke cycle.

According to the present invention, the components of the power unit are advantageously operated by an internal combustion engine of the type used for marine propulsion, thus suitable to be cooled with seawater.

Besides allowing a noteworthy reduction in weight and costs with respect to prior art solutions, the power unit according to the invention is advantageous as the accessories required for operation of the air conditioning system are all mechanically operated, eliminating the electrical phase, with consequent improvement of the global efficiency of the system, through saving of an energy transformation step.

A further advantage is the availability of the same type of fuel supplied by the same boat's tank for both the internal combustion engines.

The solution of the present invention is also advantageous from the viewpoint of costs. In fact, the power unit uses, in a new way, a type of four stroke engine, mass-produced at limited costs, light and already designed to operate in water, and thus suitable to be cooled directly with fresh water or seawater and which, by virtue of the most recent anti-pollution regulations, respects the environment. By eliminating the need to generate current for an electric compressor it is possible to obtain greater outputs with considerable savings in weight.

No modifications are made to the circulation systems of the thermal exchange fluid present in the circuit of the conditioning system, or to the circuit for circulation of warmed/cooled water, nor, for example, is the use of new heat exchange means introduced, with respect to those already known in the state of the art.

The present invention instead allows elimination of the generator set to operate the electric compressor, replacing it with a mechanically operated one, with the same rated power, for example a belt-driven compressor of automobile origin, thus eliminating a step in the thermodynamic chain. In fact, the "electrical" phase is no longer used to compress the fluid.

The mechanical compressor is thus operated, through the belt, by an internal combustion engine of the type used for marine propulsion, preferably with a four-stroke cycle, and it is preferably an engine fueled with the same fuel of the main ICE for marine propulsion.

Advantageously, marine propulsion engines of the type normally mass-produced can be used, such as outboard engines with powers up to 30 hp. It would obviously be possible also to apply the idea to systems that require greater powers, for example in the case in which it is necessary to install the power unit on larger boats with respect to those for which the present invention has been conceived. As already explained, larger boats (e.g.: more than 55 ft long) are very likely to have a power generator set installed for reasons that are independent from the air-conditioning system. Systems are more complex and quite often they include one or more A.C. only component. In this cases, the air conditioning system described in this document still keeps the advantage of providing a system that is independent from boat electrical power source, as it is completely separate from the boat one.

In the power unit according to the invention, all the components are operated simultaneously by the internal combustion engine. The transmission of motion can, for example, be obtained through one or more drive belts, stretched between the pulleys connected to this engine, to the compressor, to the mechanical pump and to the rotating electrical machines.

For example, according to a possible embodiment, the components of the power unit can include: an internal combustion engine, fueled by gasoline or diesel; a mechanical compressor for air conditioning systems, such as a compressor normally used in the automobile industry; a mechanical pump for circulation of the heat exchange fluid, for example seawater; an alternator for generating the current intended to supply the fan coils and other devices or circuits which require electrical power when the internal combustion engine is operated during navigation; an alternating current electric motor to operate the unit, in place of the internal combustion engine, during periods in which the boat is in port; and a mechanical pump for circulation of the carrier fluid, such as distilled water with additives, along a closed circuit.

The insertion of an alternator in the power unit between the utilities driven by the belt and operated by the internal combustion engine allows transformation of part of the mechanical energy into electrical energy to contribute toward charging the batteries which, in turn, power the fans of the fan coil.

The alternator, of adequate size, can for example be of the same type already used on propulsion engines for boats. In the case of breakdown of the main electrical system, it can provide a further safety element, also due to the provision for manual starting typical of small power gasoline-fueled engines, especially those for outboard propulsion.

Alternatively, a rotating electrical machine of reversible type can be provided, which can operate as an electric motor when it receives electrical power while the boat is in port, or as an electrical current generator when it is driven in rotation by the internal combustion engine during navigation.

As mentioned, the limits to the use of air conditioning systems while in port are the noise of the generators, although silenced and contained in sound-proofed boxes, and the emission of fumes into the atmosphere. The presence of an alternating current electric motor allows operation of the unit also while the boat is in port without producing polluting emissions.

In fact, mooring in port allows access to the shore power network as an energy source and therefore the electric motor can be supplied using a socket and connection cable. The power required for operating the compressor, seawater circulation pump and alternator is thus supplied by the electric motor, reducing noise completely and eliminating emissions of polluting gases. Only the water circulating in the heat exchanger to be warmed/cooled by the thermal exchange fluid will be discharged while the boat is in port.

To ensure operation of the unit by the electric motor, the internal combustion engine will preferably be provided with an electromagnetic clutch or with a freewheel mechanism to prevent it from rotating when the power is supplied by the electric motor. This latter, in turn, if necessary can be provided with a freewheel mechanism to prevent rotation of the shaft when the power is supplied by the internal combustion engine.

The fluid compressor can advantageously be of the type used in the automobile industry as it is particularly suitable for small-medium sized boats, mainly operated by gasoline engines, and allows economies of scale through mass production.

The water circulation pump can advantageously be employed to provide different functions. Firstly, the pump provides the water for the cooling circuit of the engine (as already provided for a conventional outboard engine that draws water through a pump) and, secondly, it supplies the warming/cooling circuit of the thermal exchange fluid in countercurrent.

Moreover, the pump can also perform the function of emergency pump. In fact, by providing a three-way valve or cock, instead of drawing from a water intake passing through the hull, the pump can draw directly from the engine room (if installed on an inboard engines powered boat or also from another compartment or room, depending on installation of the system) and thus be used as emergency bilge pump.

All components of the power unit can be mounted in a compact form on a single flat support plate. The components can also be closed in a box, made of moulded plastic, fibreglass or another suitable material, coated internally with a sound-damping material. The flat support plate can also form a wall of the box.

The box is in any case provided with openings for air intake, passages for the fuel supply pipes, passages for the thermal exchange fluid circulation circuit pipes, and passages for the water circulation circuit and for discharge of the exhaust gases produced by the internal combustion engine. If water is to be used as circulating medium, the heat exchanger for exchange between the thermal exchange fluid of the conditioning system and the water sent to the fan coils can also be mounted on the plate, and therefore this component can also be enclosed inside the box.

BRIEF DESCRIPTION OF THE DRAWING

Further advantages and characteristics of the present invention will be apparent from the description below, provided with reference to the drawings attached by way of non-limiting example, wherein.

DETAILED DESCRIPTION OF THE PREFERRED EMBODIMENT

Figure 1:
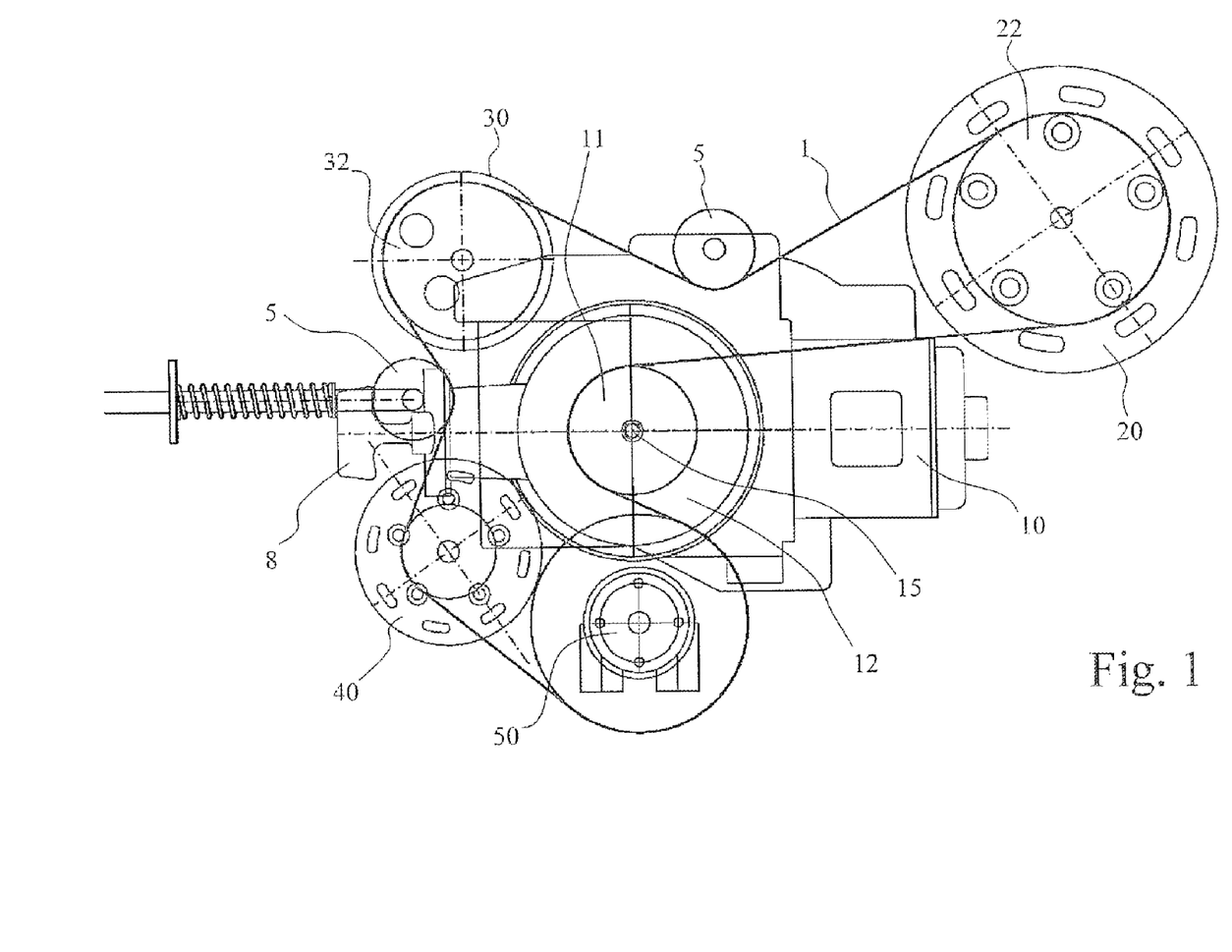
FIG. 1 shows a schematic view of the components of a power unit according to a possible embodiment, which provides for the use of a gasoline-fueled internal combustion engine.

The embodiment shown in FIG. 1 provides for a power unit in which an internal combustion engine 10 is installed, preferably with four-stroke cycle intended for marine propulsion, and fueled for example by gasoline.

On the shaft 15 of the internal combustion engine 10 a pulley 11 is connected, which drives a belt 1 connected to the pulleys of the components of the power unit. Connection between the pulley 11 and the shaft 15 is preferably obtained through a freewheel mechanism 12 to prevent the engine 10 from being driven in rotation when the unit is operated by the electric motor 20.

A freewheel mechanism 22 can also be provided for the electric motor 20, to prevent it from being driven in rotation when the unit is operated by the engine 10. In fact, the alternating current electric motor 20 allows operation of the unit, in place of the internal combustion engine, while the boat is in port.

The compressor 30 is preferably a mechanical compressor for air conditioning systems, for example a compressor normally used in the automobile industry. The compressor 30 is preferably equipped with an electromagnetic clutch 32 capable of activating/deactivating, in a controlled manner, the driving in rotation thereof by the belt 1 under the action of the internal combustion engine 10 or of the electric motor 20. The electromagnetic clutch 32 of the compressor 30 will be controlled by a control system of the air conditioning system, which will connect and/or disconnect the compressor on the basis of the operating parameters of this system.

The alternator 40 is preferably of the type already used in propulsion engines for boats, generally of automobile origin. The alternator 40 allows part of the mechanical energy produced by the engine 10 to be transformed into electrical energy, in order to contribute toward charging the batteries, which, in turn, will supply devices and circuits which require electrical power, for example the fans of the fan coils. The batteries charged by the alternator 40 can also be used in the event of an emergency, also to start the propulsion engine of the boat. It is also possible to use this motor as an electric generator when the combustion engine is activated.

The mechanical pump 50 is essentially used for water circulation in the cooling circuit of the internal combustion engine 10, as already provided, for example, for a conventional outboard engine which draws water through a pump, and to supply a heat exchanger with the water and the fluid circulating in the conditioning system in countercurrent. Mechanically or hydraulically operated belt tensioner rollers 5 are appropriately disposed along the path of the belt 1.

The embodiment of FIG. 1 also shows a member 8 for manual starting of the internal combustion engine 10, generally provided on outboard propulsion engines.

Figure 2:
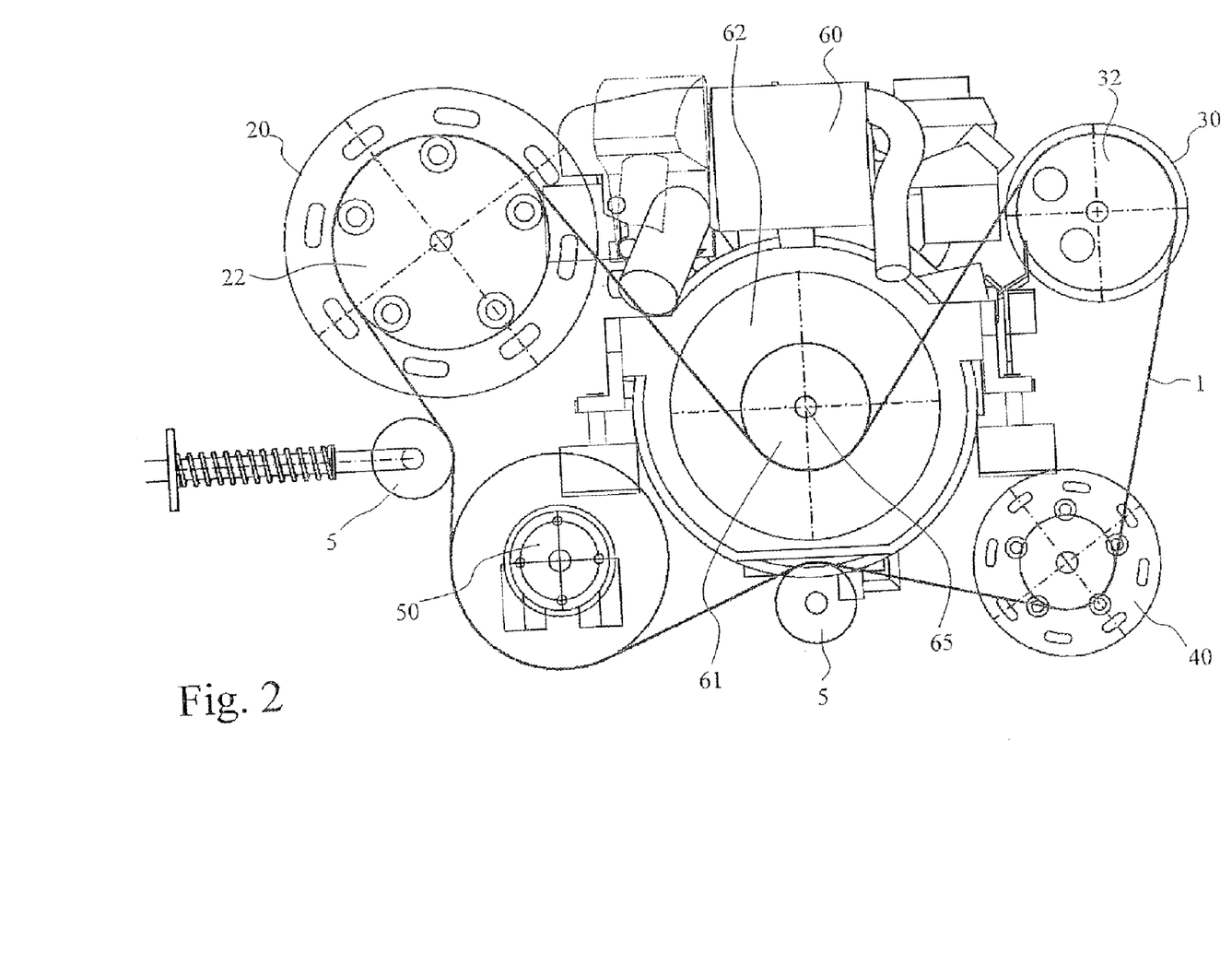
FIG. 2 shows a schematic view of the components of a power unit according to another possible embodiment, which provides for the use of a diesel-fueled internal combustion engine.

FIG. 2 represents an embodiment of the power unit, which provides for the use of an internal combustion engine 60, of the diesel-fueled type, intended for marine propulsion. All components common to the embodiment of FIG. 1 are indicated with the same reference numbers. Also in this case, the shaft 65 of the engine 60 is connected to the respective pulley 61 through a freewheel mechanism 62, and a same freewheel mechanism 22 is associated with the electric motor 20.

For all the embodiments of the present invention, the power unit provides for operation of the components by the internal combustion engine 10 or 60 during navigation, while when the boat is in port operation is implemented through the electric motor 20. When the unit is operated by the internal combustion engine 10 or 60, the freewheel mechanism 22 prevents the motor 20 from being driven in rotation. Likewise, the freewheel mechanisms 12 or 62 prevent the respective engines 10 or 60 from being driven in rotation when operation is entrusted to the electric motor 20. Alternatively to the freewheel mechanisms 12 and 62 present on the internal combustion engines 10 and 60, electromagnetically controlled clutches, such as that already provided for the compressor 30, can instead also be used.

In another more economical embodiment, the electric motor for operating the system when the boat is in port can be eliminated.

Figure 3:
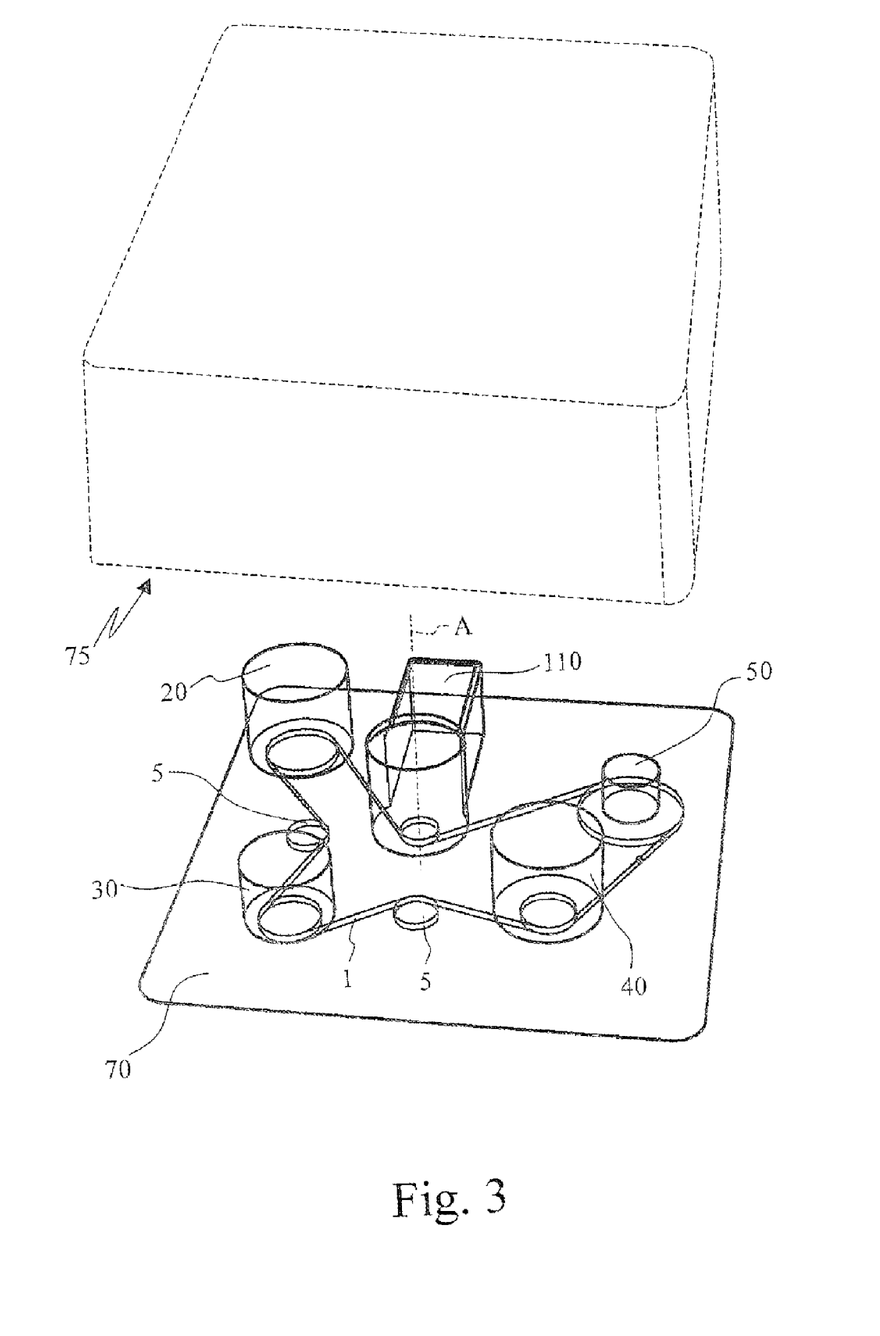
FIG. 3 is a schematic view showing the arrangement of the components on a flat support plate in the case in which an outboard propulsion engine is used, therefore with vertical motor axis.

FIG. 3 shows an embodiment in which the components of the units are mounted on a flat support plate 70. The internal combustion engine 110 is an engine of the type used for outboard propulsion, i.e. an engine that has a rotation axis A of the shaft disposed vertically. All the components of the unit are mounted on the plate 70 with rotation axis perpendicular to the plane of this plate, which is thus installed on the boat in a substantially horizontal position.

The components of the unit can, if necessary, be enclosed in a sound proofed casing 75 to form a "box" of which the plate 70 forms the bottom wall.

Figure 4:
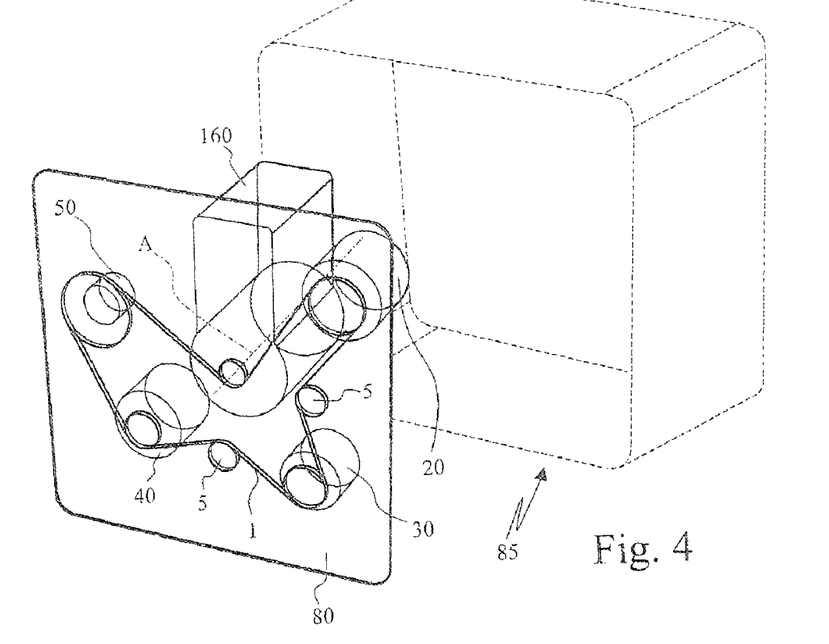
FIG. 4 is a schematic view showing the arrangement of the components on a flat support plate in the case in which an inboard propulsion engine is used, therefore with horizontal motor axis.

The power unit of the embodiment of FIG. 4 instead provides for the use of an internal combustion engine 160 of the type used for inboard propulsion with rotation axis A disposed horizontally.

The engine 160 and the other components of the unit are mounted on the plate 80 with the rotation axis perpendicular to the plane of this plate, which is thus installed on the boat in substantially vertical position. Also in this case, the components of the unit can, if necessary, be enclosed in a sound proofed casing 85 to form a "box" of which the plate 80 forms a sidewall.

Figure 5:
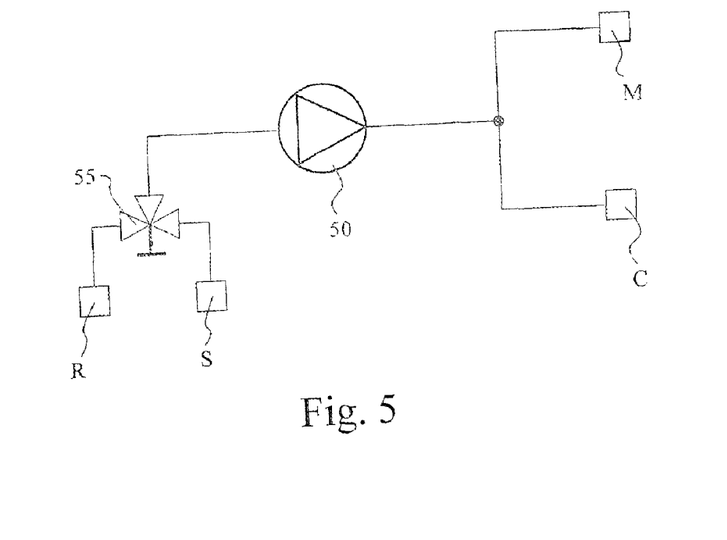
FIG. 5 schematically shows the pump associated with the power unit and any suction and delivery branches for performing the various functions.

FIG. 5 schematically shows a mechanical pump 50 belonging to the power unit according to the present invention and a three way valve 55 (or cock) placed along the suction circuit of this pump.

In a first position of the three way valve 55, the pump 50 draws from a water intake S which passes through the hull, as occurs normally, while in a second position of the three way valve 55 the pump can draw water from a suction intake R for example located in the engine room (or also from another compartment or room, depending on installation of the system) and thus be used as emergency bilge pump.

The water drawn is sent from the pump 50 toward a circuit M intended to cool the engine and toward a circuit C for warming/cooling the thermal exchange fluid in countercurrent. The water is ejected from the same exhaust pipe as the exhaust gases, after having been mixed with these, to further deaden the noise generated by the internal combustion engine.

Figure 6:
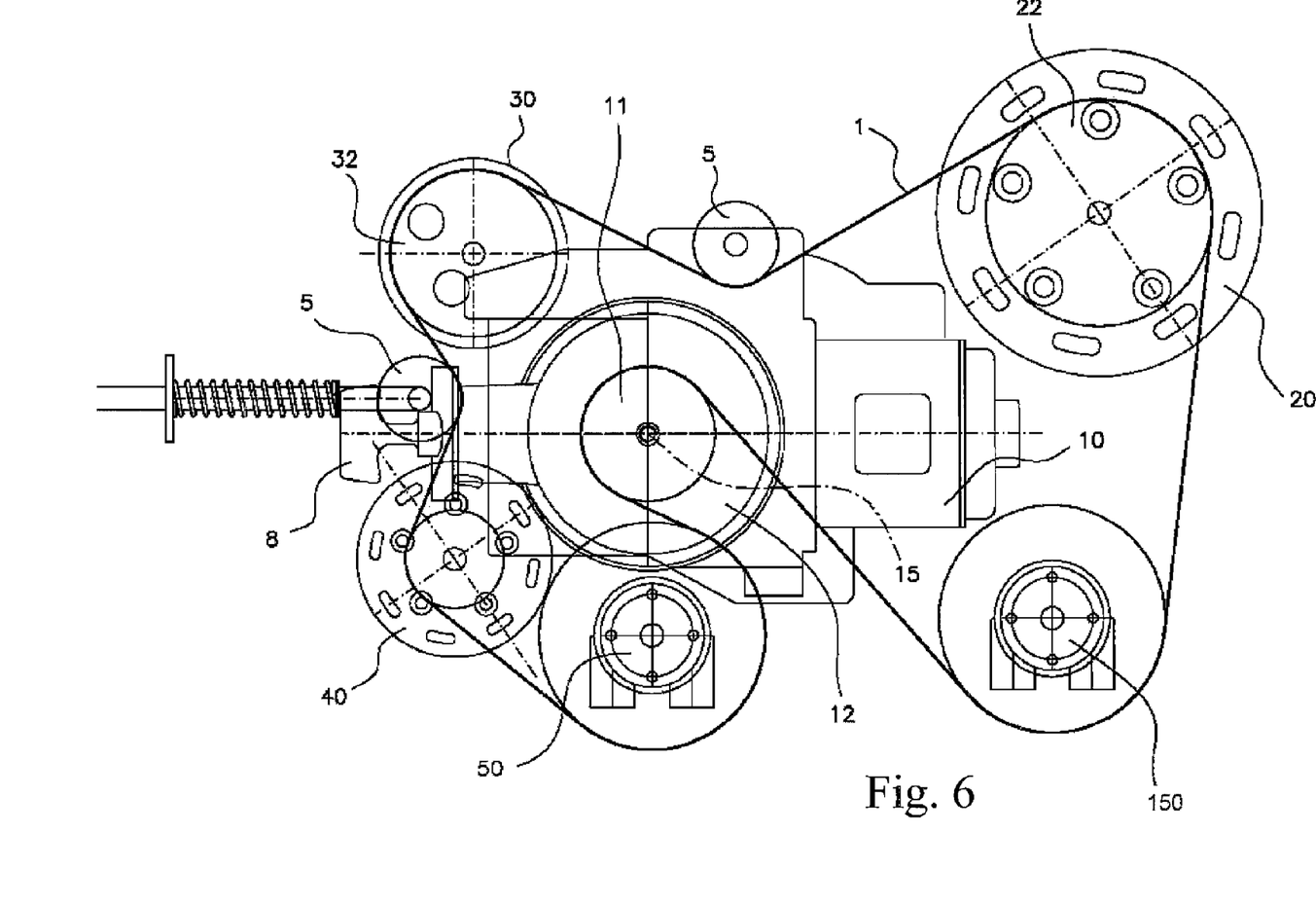
FIG. 6 is a schematic view of another embodiment of a power unit similar to that of FIG. 1, in which a pump has been added for circulation of treated water in a closed circuit.
Figure 7:
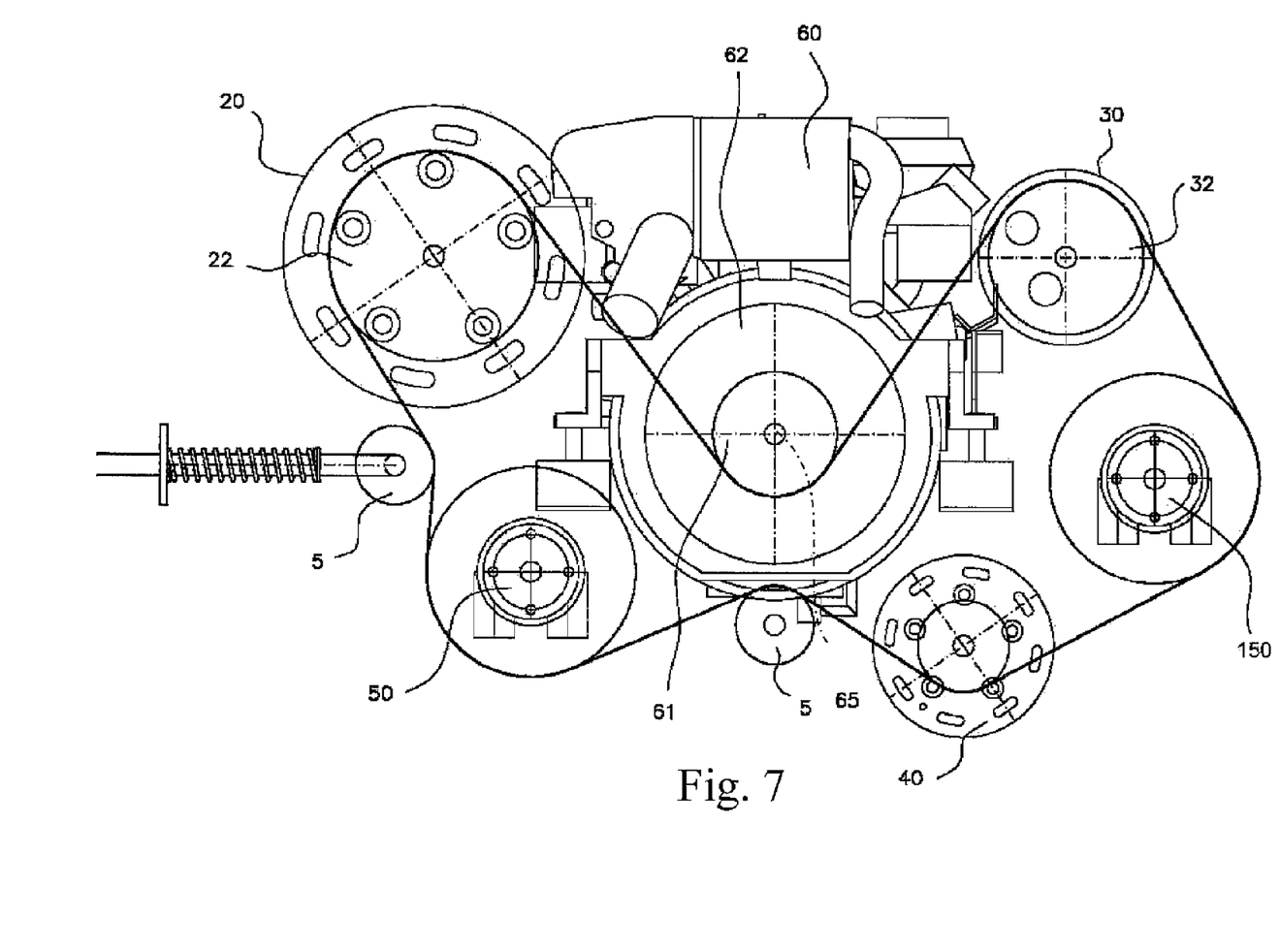
FIG. 7 is a schematic view of a further embodiment of a power unit similar to that of FIG. 2, in which a pump has been added for circulation of treated water in a closed circuit.

FIGS. 6 and 7 respectively represent alternative embodiments to those already shown with reference to FIGS. 1 and 2 respectively. In these embodiments a further pump 150 is provided for circulation of treated water, for example distilled water with additives, in a closed circuit.

Figure 8:
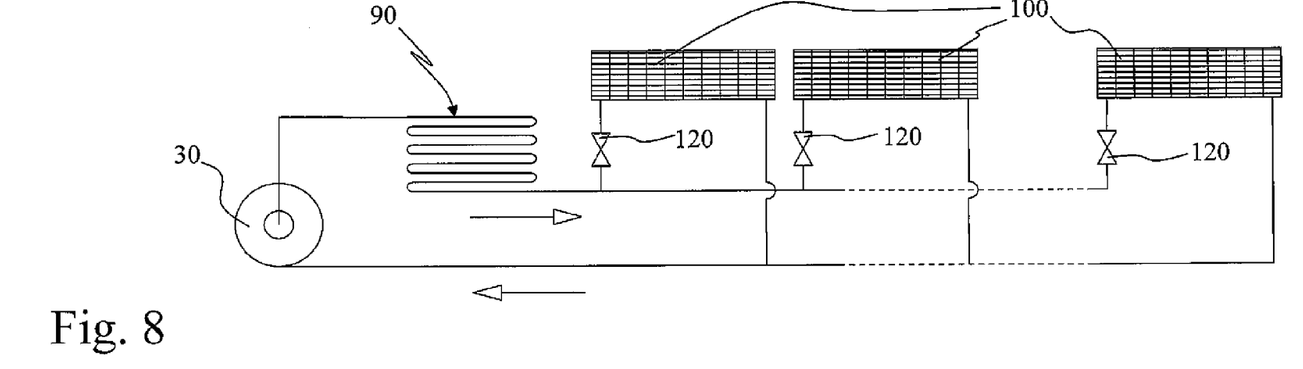
FIG. 8 shows a diagram of an air conditioning system with circulation of a thermal exchange fluid sent directly to the fan coils.

In fact, the embodiments of FIGS. 1 and 2 can be utilized in a system such as that shown schematically in FIG. 8, in which the thermal exchange fluid pressurized by the compressor 30 passes through a condenser 90 and then to the fan coils 100 each equipped with its own throttling valve 120. The thermal exchange fluid delivered from the fan coils 100 is then returned toward the compressor 30.

Figure 9:
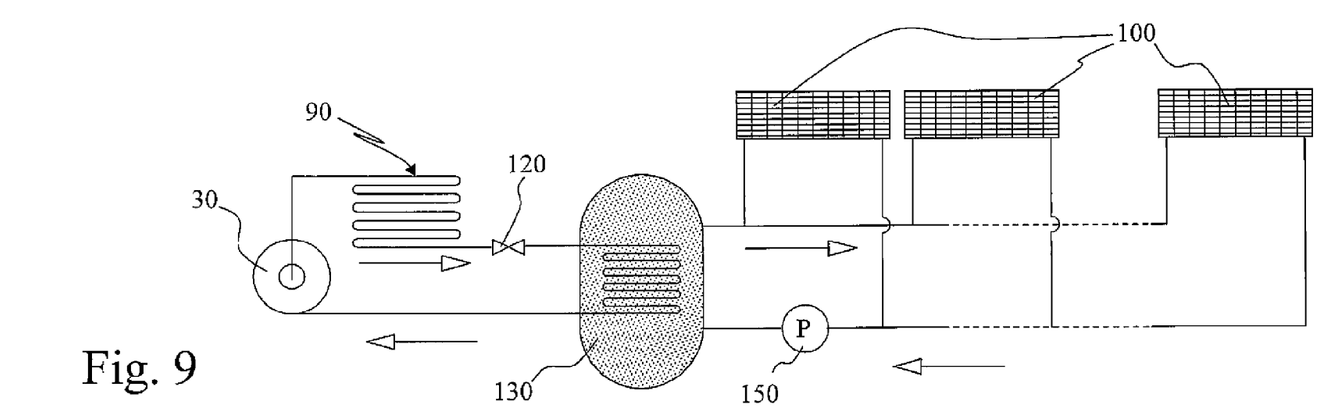
FIG. 9 shows a diagram of an air conditioning system with circulation of treated water previously warmed/cooled and then sent to the fan coils.

In the system diagram of FIG. 9, the fan coils 100 are instead connected in a closed circuit where the treated water present in the circuit is circulated by the pump 150, which is part of the power unit represented in FIGS. 6 and 7. The treated water is first warmed/cooled in a countercurrent heat exchanger 130, in which it is placed in heat exchange relation with the thermal exchange fluid circuit.

Various modifications can be made to the embodiments represented here without departing from the scope of the present invention. For example, in place of the alternator 40 and of the electric motor 20, a rotating electrical machine of reversible type can be used, i.e. a machine capable of operating as generator when it is driven in rotation, or as motor when it is electrically powered.

Figure 10:
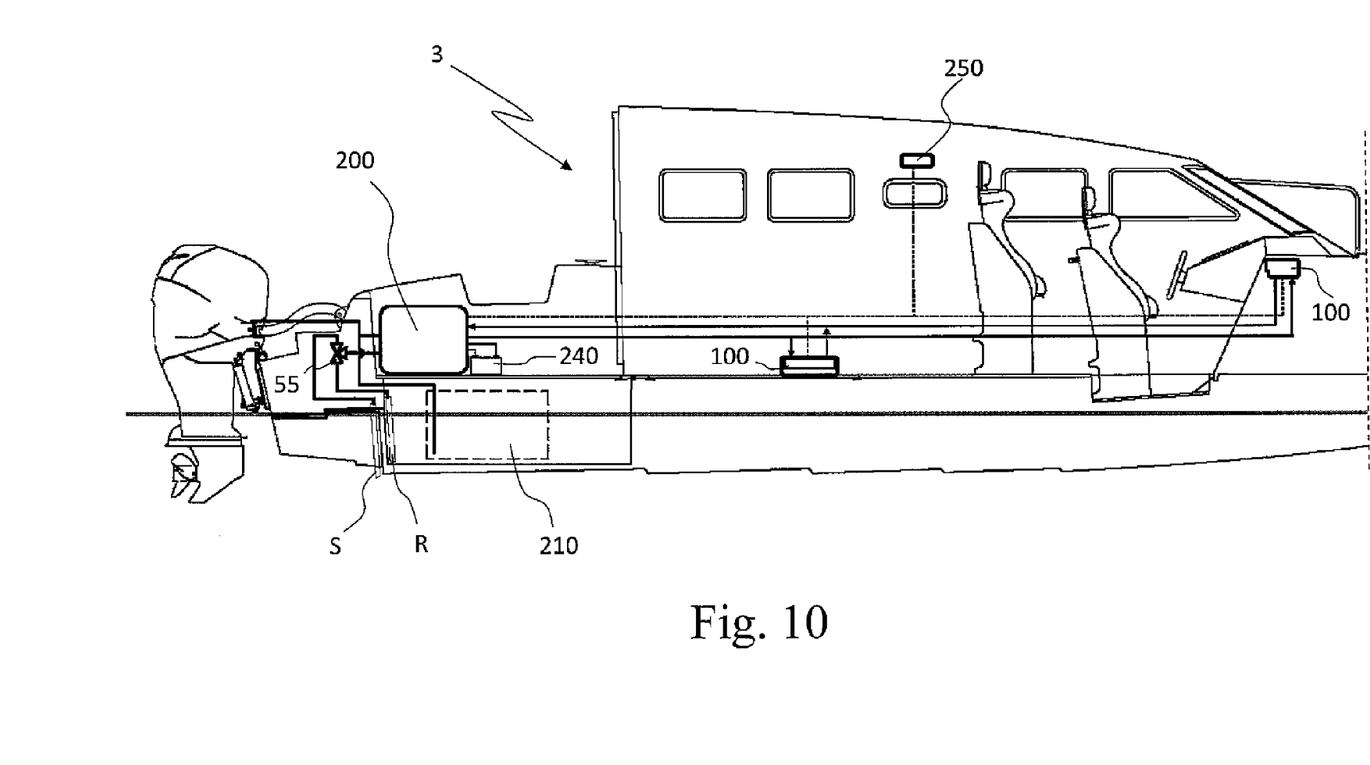
FIG. 10 shows a schematic diagram of a conventional cabin cruiser provided aboard with an air conditioning system and a power unit as shown in FIGS. 1-7.

FIG. 10 shows a conventional power boat 3 with outboard propulsion engine(s) provided with an air conditioning system in which an auxiliary power unit 200 is installed. The unit 200 is fueled with the same fuel of the propulsion engine(s) from a tank 210. The power unit 200 is also connected to onboard batteries 240 to contribute toward charging the batteries, which, in turn, power the fans of the fan coils 100.

A control unit 250 controls the unit 200, as for example to connect and/or disconnect the compressor of the unit 200, as well as the operation of the fan coils 100 to obtain the desired temperature value. The auxiliary power unit 200 of FIGS. 1-7 may be placed onboard the conventional power boat 3 of FIG. 10 and connected to supply power to the air conditioning system and be fueled by the same fuel of the propulsion engine(s) from the tank 210.

As a result, the conventional power boat 3, which is equipped with an on board air conditioning system becomes equipped with an auxiliary power unit 200. There is also a main power unit for marine propulsion of the power boat. The auxiliary power unit 200 includes at least one drive motor and means for driving the following components in rotation: at least one compressor connected to a circuit of the on board conditioning system; at least one mechanical pump for circulating a thermal exchange fluid along an open circuit; and one or more rotating electrical machines, wherein said at least one drive motor is an internal combustion engine with a four stroke cycle.

FIG. 10 shows the three way valve 55 (or cock) placed along the suction branch of the pump 50 of FIG. 5. As in a first position of the three way valve 55, the pump 50 (FIG. 5) draws from a water intake S (see FIGS. 5, 10) which passes through the hull, as occurs normally, while in a second position of the three way valve 55 the pump can draw water from a suction intake R (see FIGS. 5, 10) for example located in the engine room (or also from another compartment or room, depending on installation of the system) and thus be used as emergency bilge pump.

What is claimed is:

1. A power boat equipped with an on board air conditioning system that includes an on board conditioning unit, comprising an auxiliary power unit for powering the on board conditioning unit without also powering marine propulsion drive of the power boat, the auxiliary power unit comprising at least one drive motor and means for driving the following components in rotation: at least one compressor connected to a circuit of the on board conditioning unit; at least one mechanical pump for circulating a heat exchange fluid along an open circuit; one or more rotating electrical machines, wherein said at least one drive motor is an internal combustion engine with a four stroke cycle; and a common fuel tank, and means for both fueling a main internal combustion engine of a main power unit that powers a drive for marine propulsion of the power boat and for fueling the internal combustion engine of the auxiliary power unit with fuel from the common fuel tank.

2. The power boat as claimed in claim 1, wherein said drive motor is a marine gasoline-fuelled engine of the outboard type with vertical motor axis.

3. The power boat as claimed in claim 1, wherein said drive motor is a marine diesel engine of the outboard type with vertical motor axis.

4. The power boat as claimed in claim 1, wherein said drive motor is a marine gasoline-fuelled engine with horizontal motor axis.

5. The power boat as claimed in claim 1, wherein said drive motor is a marine diesel engine of the inboard-outboard type with horizontal motor axis.

6. The power boat as claimed in claim 1, wherein at least one mechanical pump is also provided for circulation of a heat carrier fluid along a closed circuit.

7. The power boat as claimed in claim 1, wherein said heat exchange fluid is water.

8. The power boat as claimed in claim 1, wherein said one or more rotating electrical machines include at least one alternator.

9. The power boat as claimed in claim 1, wherein said one or more rotating electrical machines include at least one motor.

10. The power boat as claimed in claim 1, wherein said one or more rotating electrical machines include a reversible type machine which can operate as an electric motor or as an electrical current generator.

11. The power boat as claimed in claim 1, wherein said motion transmission means include one or more drive belts, stretched between the pulleys connected to said drive motor, to said at least one compressor, to said at least one mechanical pump and to said one or more rotating electrical machines.

12. The power boat as claimed in claim 1, wherein said motion transmission means include an electromagnetically controlled clutch connected to the shaft of said internal combustion engine.

13. The power boat as claimed in claim 1, wherein said motion transmission means include a freewheel mechanism connected to the shaft of said internal combustion engine.

14. The power boat as claimed in claim 1, wherein said motion transmission means include a freewheel mechanism connected to the shaft of one or more of said rotating electrical machines.

15. The power boat as claimed in claim 1, wherein said internal combustion engine includes manually operable starting means.

16. The power boat as claimed in claim 1, further including at least one flat support plate for said components, wherein said components are mounted with rotation axes of the respective shafts disposed perpendicular to said flat support plate.

17. The power boat as claimed in claim 1, also including at least one three way valve along the suction branch of said mechanical pump along said open circuit.

18. The power boat as claimed in claim 1, further comprising a boat body on which is installed the on board conditioning unit and the on board auxiliary power unit, the boat body being selected from the group consisting of body of a cabin cruiser and body of a cruising yacht.

19. An apparatus for a power boat, comprising an auxiliary power unit powered with mechanical energy supplied selectively from an internal combustion engine of the auxiliary power unit and an alternating current electric motor that is driven into rotation, preventing means for preventing the internal combustion engine from being driven as the alternating current electric motor is driven into rotation to supply the mechanical energy to the power unit and for preventing the alternating current electric motor from being driven into rotation as the internal combustion engine is being driven to supply the mechanical energy to the power unit, said preventing means including at least one of a freewheel mechanism and a electromagnetic clutch, an alternator for transforming part of the mechanical energy supplied by the internal combustion engine into electrical energy, an onboard conditioning unit that includes a mechanical compressor and means for activating and deactivating the mechanical compressor in a controlled manner under action selectively from the internal combustion engine and from the alternating current electric motor; a mechanical pump for effecting water circulation in a cooling circuit of the internal combustion engine and for effecting heat exchange between the water circulation and a thermal exchange fluid in the conditioning unit; a common fuel tank, and means for both fueling a main internal combustion engine of a main power unit that powers a drive for marine propulsion of the power boat and for fueling the internal combustion engine of the auxiliary power unit with fuel from the common fuel tank.

20. The apparatus of claim 19, further comprising a flat support plate onto which are mounted the internal combustion engine, the electric motor, the alternator, the preventing means, and the mechanical pump.

21. The apparatus of claim 20, further comprising a box mounted on the support plate to enclose each of the internal combustion engine, the electric motor, the alternator, the preventing means, and the mechanical pump.

\* \* \* \* \*